US00RE50593E

(19) United States
(12) Reissued Patent
Huang et al.

(10) Patent Number: US RE50,593 E
(45) Date of Reissued Patent: Sep. 23, 2025

(54) ELECTRIC AND MECHANICAL STRETCHING APPARATUS FOR MOVABLE SOFA

(71) Applicant: REMACRO TECHNOLOGY CO., LTD., Jiangsu (CN)

(72) Inventors: Bruce Huang, Jiangsu (CN); Dick Qin, Jiangsu (CN); James Li, Jiangsu (CN); Daniel Wang, Jiangsu (CN); Jerry Zou, Jiangsu (CN); Lynn Wu, Jiangsu (CN)

(73) Assignee: REMACRO TECHNOLOGY CO., LTD., Jiangsu (CN)

(21) Appl. No.: 16/900,305

(22) Filed: Jun. 12, 2020

Related U.S. Patent Documents

Reissue of:
(64) Patent No.: 9,756,949
Issued: Sep. 12, 2017
Appl. No.: 14/781,567
PCT Filed: Apr. 16, 2014
PCT No.: PCT/CN2014/075457
§ 371 (c)(1),
(2) Date: Sep. 30, 2015
PCT Pub. No.: WO2015/096305
PCT Pub. Date: Jul. 2, 2015

(30) Foreign Application Priority Data

Dec. 24, 2013 (CN) ..... 201310719702.0

(51) Int. Cl.
*A47C 17/04* (2006.01)
*A47C 1/031* (2006.01)
(Continued)

(52) U.S. Cl.
CPC ..... *A47C 17/04* (2013.01); *A47C 1/031* (2013.01); *A47C 1/0345* (2013.01);
(Continued)

(58) Field of Classification Search
CPC ..... A47C 1/0355; A47C 17/86; A47C 17/04; A47C 1/031; A47C 1/0345; A47C 1/0342; A47C 1/03211; A47C 1/032; Y10T 74/20
See application file for complete search history.

(56) References Cited

U.S. PATENT DOCUMENTS 8,308,228 B2 * 11/2012 Lawson ..... A47C 1/029 297/331
8,443,690 B2 * 5/2013 Koga ..... B60N 2/0232 297/362.11
(Continued)

FOREIGN PATENT DOCUMENTS

CN 103445558 A * 12/2013
GB 2283908 * 5/1995
WO WO9746411 * 12/1997

*Primary Examiner* — William C Doerrler
(74) *Attorney, Agent, or Firm* — Arch & Lake LLP

(57) ABSTRACT

The invention is an electromechanical stretching apparatus of a convertible sofa, which consisting of a mechanical stretching apparatus and an electric actuator, the mechanical stretching apparatus being provided with an electrically-driven connecting rod, wherein, the electric actuator consists of a motor, a motor connecting tube, a motor movable slider, and a motor head fixing part, the motor adopted is a motor with a guide rail, the motor movable slider is installed on the guide rail of the motor, the motor head is rotationally connected through a second rotor shaft to the motor head fixing part fastened on the electrically-driven connecting rod, the motor connecting tube is connected to the motor movable slider through a first rotor shaft and the motor connecting tube is fastened on the mechanical stretching apparatus. The said motor connecting tube is fastened on a linkage part of the mechanical stretching apparatus. The said first rotor shaft and the second rotor shaft are both a bolt. By changing the electronic driving device, the invention increases automaticity and comfort of the convertible sofa,
(Continued)

and improves installation, removal, maintenance, and operation efficiency of an electric actuator of the convertible sofa.

1 Claim, 5 Drawing Sheets

(51) Int. Cl.

| | |
|---|---|
| ***A47C 1/032*** | (2006.01) |
| ***A47C 1/034*** | (2006.01) |
| ***A47C 1/0355*** | (2013.01) |
| ***A47C 17/86*** | (2006.01) |

(52) U.S. Cl.
CPC ..... *A47C 1/0355* (2013.01); *A47C 17/86* (2013.01); *A47C 1/032* (2013.01); *A47C 1/03211* (2013.01); *A47C 1/0342* (2013.01); *Y10T 74/20* (2015.01)

(56) References Cited

U.S. PATENT DOCUMENTS 8,944,498 B2 * 2/2015 Lawson ..... A61G 5/14 297/DIG. 10
8,991,925 B2 * 3/2015 LaPointe ..... A61G 5/14 297/325
9,398,810 B2 * 7/2016 Donovan ..... A47C 1/0342
9,433,294 B2 * 9/2016 Donovan ..... A47C 1/0242
2014/0070588 A1 * 3/2014 Wittenberg, Jr. ..... A47C 1/035 29/401.1
2015/0054315 A1 * 2/2015 Donovan ..... A47C 1/0242 297/68
2015/0054316 A1 * 2/2015 Donovan ..... A47C 1/032 297/76
2016/0022040 A1 * 1/2016 Lawson ..... A47C 1/03211 297/68
2016/0106215 A1 * 4/2016 Crum ..... A47C 1/03211 297/68
2016/0152883 A1 * 6/2016 Fernandez ..... C09K 8/34 507/136

* cited by examiner

ELECTRIC AND MECHANICAL STRETCHING APPARATUS FOR MOVABLE SOFA

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to an electromechanical stretching apparatus of a convertible sofa, and in particular, to a multi-function electromechanical stretching apparatus of a convertible sofa, where a leg can be folded or unfolded, and the angle of a back can be adjusted to a certain degree.

RELATED ART

At present, existing electromechanical stretching apparatuses of convertible sofas have four major disadvantages as follows: 1. a convertible sofa on the market has an excessively complex electrically-driven structure, thereby affecting kinetic energy efficiency of a motor; 2. an electrically-driven convertible sofa on the market may shake, so that comfort of the convertible sofa is affected; 3. installation of an electrically-driven convertible sofa on the market is complex, thereby affecting installation efficiency of the convertible sofa; 4. in an electrically-driven convertible sofa on the market, a motor head protrudes from an electrically-driven connecting rod, so that interference may occur when a leg part is completely folded, thereby affecting functions and structural stability of the sofa. Referring to FIG. 5, an electric actuator of an electrically-driven convertible sofa on the market according to the prior art, includes an electrically-driven square tube 10, an electrically-driven angle iron 11, a transmission part 12, a transmission fixed support 13, a comparison motor head fixing part 14 (the "comparison" herein is used for distinguishing from the embodiment, the same below), a comparison motor connecting tube 15, a motor fixing part 16, a motor tail fixing part 17, a comparison motor movable slider 18, a comparison motor 19, a rotor shaft transmission part 20, a rotary connecting rod 21, and a comparison electrically-driven connecting rod 9, where a front end and a rear end of the comparison motor 19 need to be respectively fastened on the comparison motor connecting rod 15 and the comparison electrically-driven connecting rod 9, and the transmission part 12, the transmission fixed support 13 and the motor fixing part 16 are combined as an electrically-driven rotary connecting part, so that liner movement of the comparison motor movable slider 18 on the comparison motor 19 is transformed to rotary movement of the electrically-driven square tube 10 and the electrically-driven angle iron 11, thereby driving the rotor shaft transmission part 20 and the rotary connecting rod 21 on the electrically-driven square tube 10 to rotate, and then actuating movement of the mechanical stretching apparatus. Iron support self-locking may occur during rotation of the rotor shaft transmission part 20 and the rotary connecting rod 21, thereby causing a problem of shaking of an original electrically-driven convertible sofa. The present invention provides improvement on the basis of the prior art as mentioned above.

SUMMARY

The present invention provides a mechanical stretching apparatus of a convertible sofa featuring a simple structure, convenient use and a novel electrically-driven function, so as to solve a technical problem, namely, overcome the foregoing disadvantages in the prior art.

To solve the above technical problem, the present invention adopts the following technical solution: An electromechanical stretching apparatus of a convertible sofa is provided, consisting of a mechanical stretching apparatus and an electric actuator, the mechanical stretching apparatus being provided with an electrically-driven connecting rod, where the electric actuator consists of a motor, a motor connecting tube, a motor movable slider, and a motor head fixing part, the motor adopted is a motor with a guide rail, the motor movable slider is installed on the guide rail of the motor, the motor head is rotationally connected through a second rotor shaft to the motor head fixing part fastened on the electrically-driven connecting rod, the motor connecting tube is connected to the motor movable slider through a first rotor shaft and the motor connecting tube is fastened on the mechanical stretching apparatus.

In the present invention, the motor connecting tube is fastened on a linkage part of the mechanical stretching apparatus.

In the present invention, the first rotor shaft and the second rotor shaft are both a bolt.

In the present invention, the motor-driven manner features a simple structure, which facilitates improving kinetic energy efficiency of the motor.

In the present invention, the electromechanical stretching apparatus has a simple structure, which facilitates improving installation efficiency of the mechanical stretching apparatus.

The present invention solves a problem of shaking of an electrically-driven convertible sofa on the market, thereby improving comfort of the convertible sofa.

In the present invention, the motor is installed conveniently, where a motor movable slider on the motor is connected to a motor head by means of bolt connection, thereby greatly improving installation and maintenance efficiency of the motor.

The present invention solves a problem that in an electrically-driven convertible sofa on the market, a motor head protrudes from an electrically-driven connecting rod, thereby avoiding interference occurring when a leg part is completed folded, and improving structural stability of the convertible sofa.

In the present invention, a convertible sofa is additionally provided with an electrically-driven function, which facilitates development of sofa styles, increases automaticity and comfort of the convertible sofa, and improves installation, removal, maintenance, and operation efficiency of an electric actuator of the convertible sofa.

Figure 1:
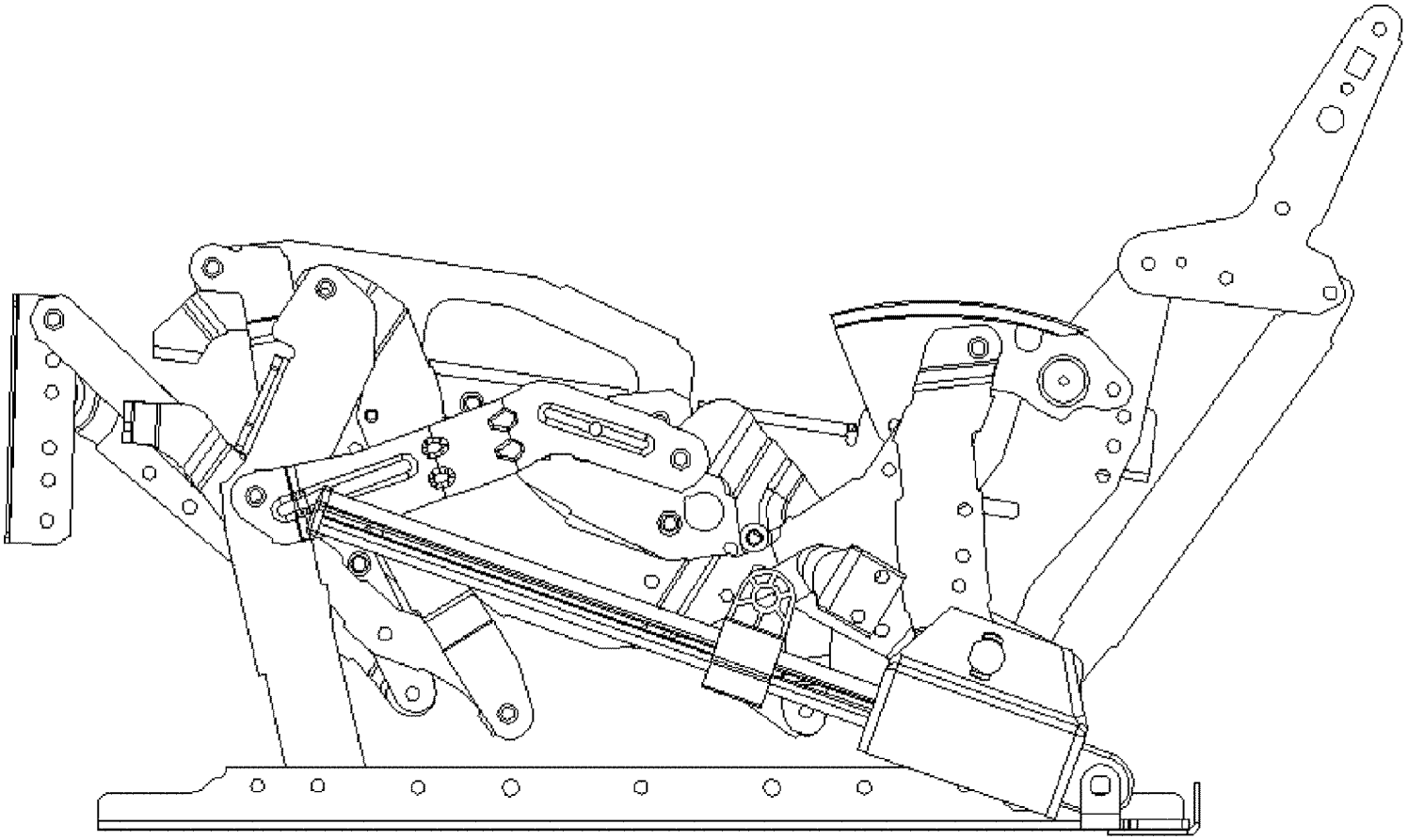
FIG. 1 is a schematic front view of an embodiment of the present invention when a leg part of a left side component or that of a right side component is completely folded.

9 represents a comparison electrically-driven connecting rod, 10 represents an electrically-driven square tube, 11 represents an electrically-driven angle iron, 12 represents a transmission part, 13 represents a transmission fixed support, 14 represents a comparison motor head fixing part, 15 represents a comparison electrically-driven connecting rod, 16 represents a motor fixing part, 17 represents a motor tail fixing part, 18 represents a comparison motor movable slider, 19 represents a comparison motor, 20 represents a rotor shaft transmission part, and 21 represents a rotary connecting rod.

DETAILED DESCRIPTION

The following further describes the present invention with reference to embodiments and the accompanying drawings.

In an embodiment of the present invention, an electromechanical stretching apparatus of a convertible sofa includes a mechanical stretching apparatus in the prior art (having a same left side component and right side component, where the left side component is connected to the right side component in a fixed manner by using a fixing part, for example, as described in Patent No. 200920200532.4, Patent Publication No. 102657449A, and Patent No. 201220668439.8), the mechanical stretching apparatus being installed with an electrically-driven connecting rod 8, and has the following structural features: an electric actuator consists of a motor 6, a motor connecting tube 2, a motor movable slider 5 and a motor head fixing part 7, the motor adopted is a motor with a guide rail 22, a motor head is rotationally connected through a second rotor shaft 4 to the motor head fixing part 7 fastened on the electrically-driven connecting rod 8, the motor connecting tube 2 is fastened through a bolt on a linkage part 3 of the mechanical stretching apparatus (the linkage part 3 is a connecting part used for fixing and transmission in a mechanical stretching apparatus of the prior art, for example, a linkage part as described in Patent No. 200920200532.4, a linkage part as described in Patent Publication No. 102657449A, and a seat support 3 as described in Patent No. 201220668439.8, and in some documents, another name such as a transmission connecting part may also be adopted), the motor connecting tube 2 is rotationally connected to the motor movable slider 5 through a first rotor shaft 1, and the motor movable slider 5 moves on the guide rail 22 of the motor 6.

In this embodiment of the present invention, the motor movable slider 5 moves along the guide rail 22 of the motor 6, so that a driving force of the motor 6 is consistent to a greatest degree with an unfolding direction in this embodiment, thereby saving energy, reducing mechanical wear and strengthening overall structure.

Figure 2:
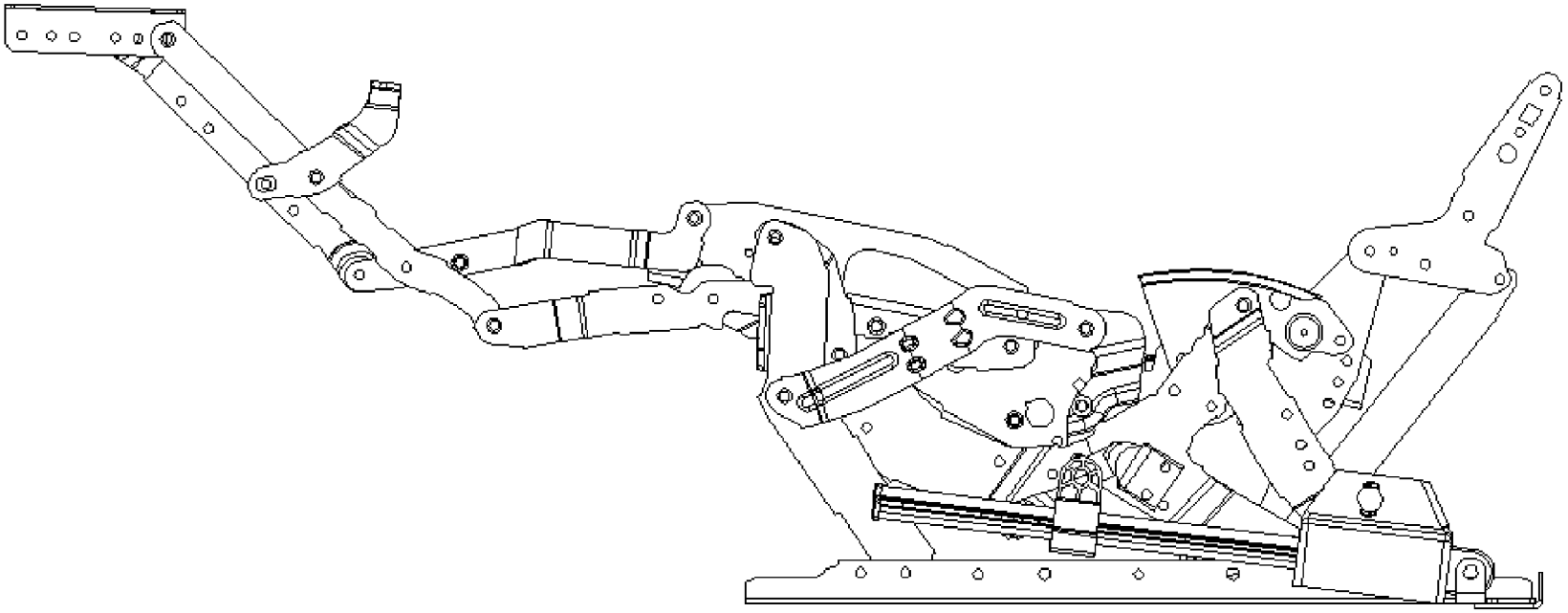
FIG. 2 is a schematic front view of an embodiment of the present invention when a leg part of a left side component or that of a right side component is completely unfolded.
Figure 3:
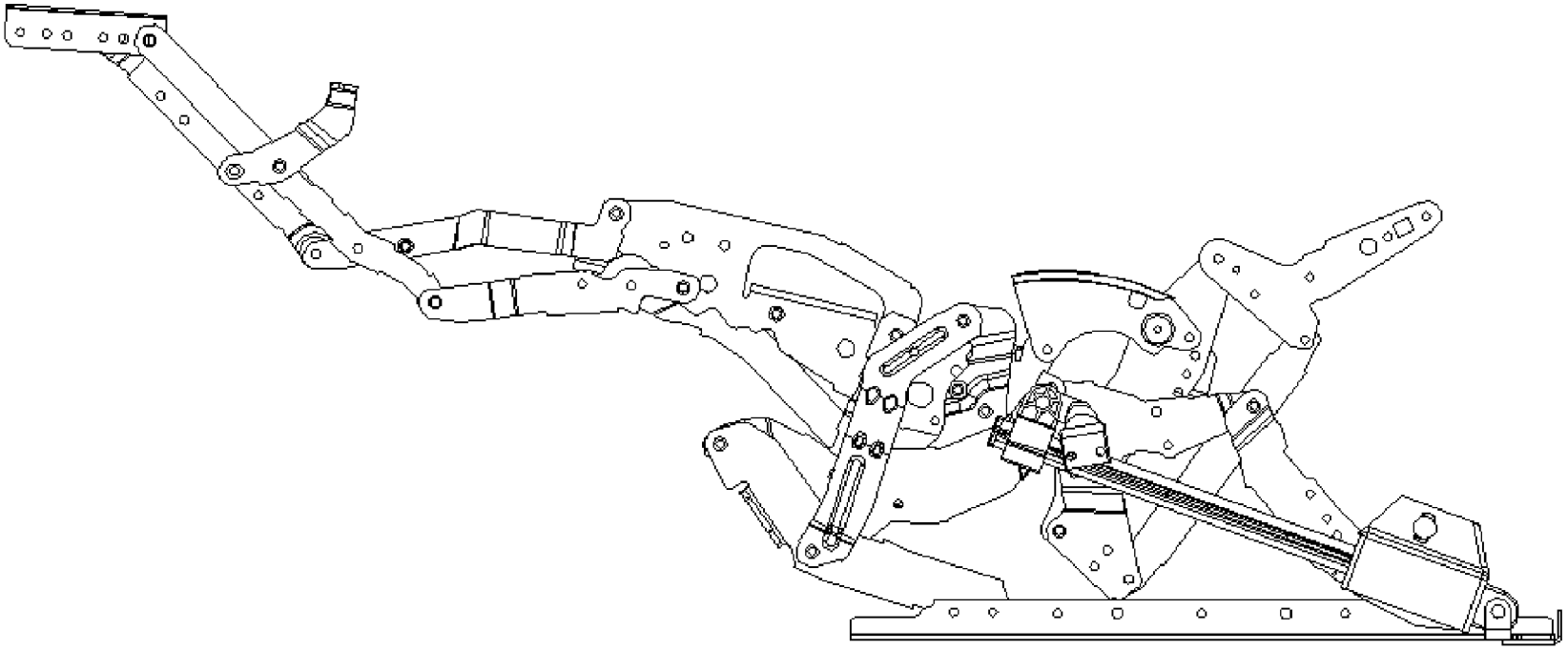
FIG. 3 is a schematic diagram of an embodiment of the present invention when a back is inclined horizontally.
Figure 4:
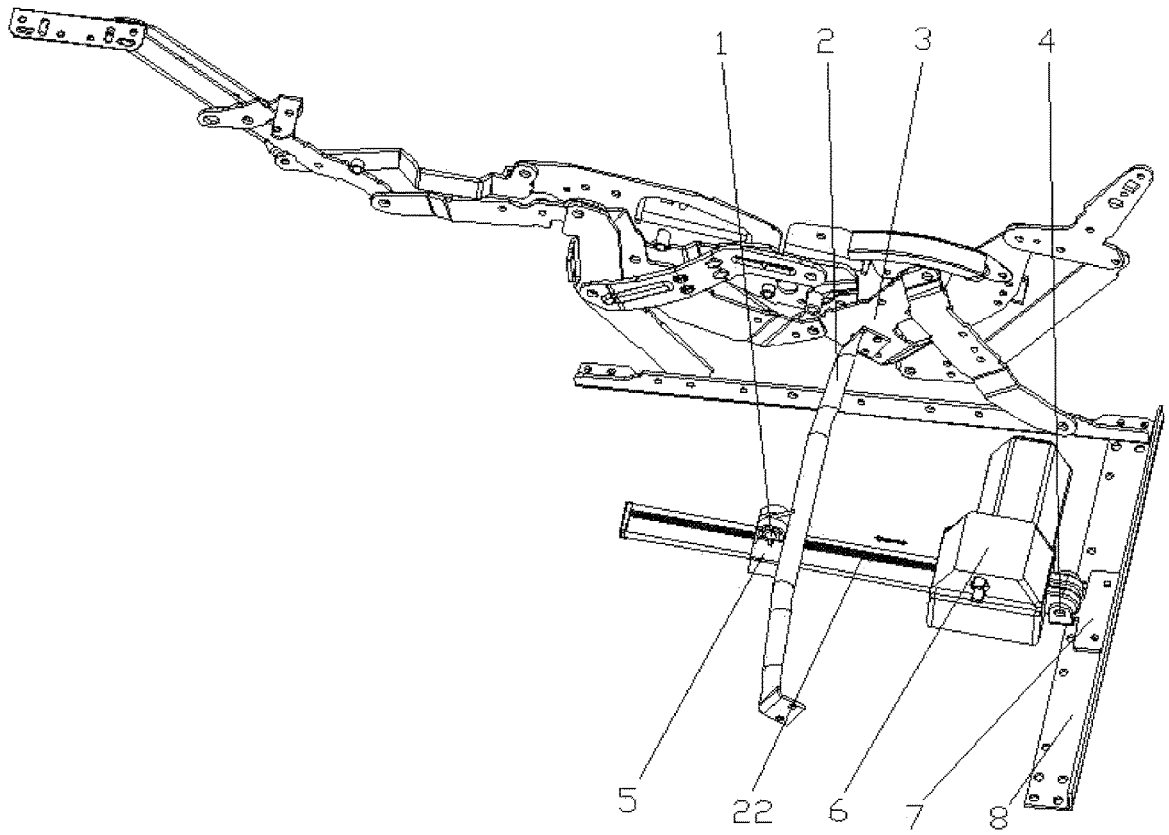
FIG. 4 is a schematic diagram of main components and an operational mode according to an embodiment of the present invention, where: 1 represents a first rotor shaft, 2 represents a motor connecting tube, 3 represents a linkage part, 4 represents a second rotor shaft, 5 represents a motor movable slider, 6 represents a motor, 7 represents a motor head fixing part, 22 represents guide rail, and 8 represents an electrically-driven connecting rod.
Figure 5:
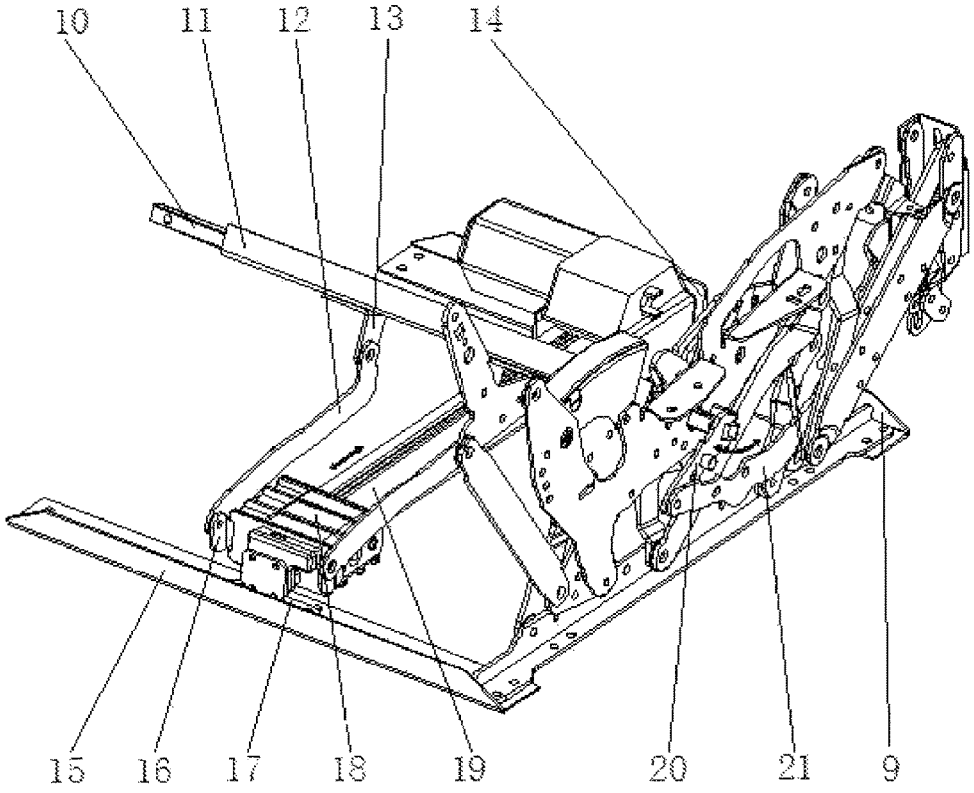
Prior Art FIG. 5
FIG. 5 is a schematic diagram of main components and an operational mode according to the prior art, where in the figures.

In this embodiment, the motion principle is that the motor connecting tube 2 rotationally connected to the motor movable slider 5 through the first rotor shaft 1 is driven by forward movement (toward left side of FIG. 4) of the motor movable slider 5 on the motor 6 along the guide rail 22 of the motor, where a motor head is rotationally connected through the second rotor shaft 4 to the motor head fixing part 7 fastened on the electrically-driven connecting rod 8, and the motor connecting tube 2 is fastened on the linkage part 3 of the mechanical stretching apparatus. Due to personal weight and an acting force of the motor connecting tube 2 driven by the motor movable slider 5, a leg structure of the mechanical stretching apparatus is unfolded first, and when being fully unfolded to a limit and contacting with a contact surface, the leg structure is prevented from being mechanically unfolded, thereby driving a back structure of the electromechanical stretching apparatus of a convertible sofa to incline horizontally, so that the electromechanical stretching apparatus of a convertible sofa performs a procedure of transformation from a state shown in FIG. 1, to a state shown in FIG. 2 and then to a state shown in FIG. 3. On the contrary, when the motor movable slider 6 moves reversely (backward, namely, toward right side of FIG. 4), the electromechanical stretching apparatus of a convertible sofa can perform a procedure of transformation from the state shown in FIG. 3, to the state shown in FIG. 2, and then to the state shown in FIG. 1. When the electromechanical stretching apparatus of a convertible sofa returns to the state shown in FIG. 1 again, that is, the leg part is completely folded, a complete procedure for electrically driving the electromechanical stretching apparatus of a convertible sofa is implemented.

In this embodiment, a manner of rotational connection of the first rotor shaft 1 and the second rotor shaft 4 is achieved by means of bolt connection, thereby achieving bolt connection of the motor 6; and the motor connecting tube 2 is fastened on the linkage part 3 of the mechanical stretching apparatus by using a bolt, which facilitates installation, removal and maintenance of the motor 6.

In this embodiment, rotational connection of the rotor shaft transmission part 20 and the rotary connecting rod 21 is removed, so as to solve a problem of shaking in an electrically-driven manner.

In this embodiment, a novel electrically-driven manner of a convertible sofa is additionally provided, while an original electrically-driven apparatus is removed, which facilitates improving installation, removal, maintenance and operation efficiency of an electric actuator of the convertible sofa, and increasing automaticity and comfort of the sofa.

It should be recognized that, any simple modification or equivalent change made to the present invention shall fall within the protection scope of the present invention.

The invention claimed is:

[1. An electromechanical stretching apparatus of a convertible sofa, consisting of a mechanical stretching apparatus and an electric actuator, the mechanical stretching apparatus being provided with an electrically-driven connecting rod, wherein, the electric actuator consists of a motor, a motor connecting tube, a motor movable slider, and a motor head fixing part, the motor adopted is a motor with a guide rail, the motor movable slider is installed on the guide rail of the motor, the motor head is rotationally connected through a second rotor shaft to the motor head fixing part fastened on the electrically-driven connecting rod, the motor connecting tube is connected to the motor movable slider through a first rotor shaft and the motor connecting tube is fastened on the mechanical stretching apparatus.]

[2. The electromechanical stretching apparatus of a convertible sofa as in claim 1 wherein said motor connecting tube is fastened on a linkage part of the mechanical stretching apparatus.]

[3. The electromechanical stretching apparatus of a convertible sofa as in claim 1 or 2 wherein the first rotor shaft and the second rotor shaft are both a bolt.]

*4. An electromechanical stretching apparatus of a convertible sofa, consisting of a mechanical stretching apparatus and an electric actuator, the mechanical stretching apparatus comprising an electrically-driven connecting rod,*

*wherein the electric actuator consists of:*

*a motor comprising a motor head and a guide rail,*

*a motor connecting tube connected to the mechanical stretching apparatus and the guide rail,*

*a motor movable slider installed on the guide rail of the motor, and*

*a motor head fixing part fastened on the electrically-driven connecting rod, and*

*wherein the motor head of the motor is rotationally and removably connected through a second rotor shaft to the motor head fixing part fastened on the electrically driven connecting rod;*

*wherein the motor connecting tube is rotationally and removably connected to the motor movable slider through a first rotor shaft;*

*wherein the motor connecting tube is fastened on the mechanical stretching apparatus via at least two connections between one end of the motor connecting tube and the mechanical stretching apparatus;*

*wherein the motor connecting tube extends to one end side at the one end of the motor connecting tube, the end side is fastened on a linkage part of the mechanical stretching apparatus via the at least two connections, the end side is substantially parallel to the linkage part, and the linkage part is not directly connected with the electrically-driven connecting rod; and*

*wherein the first rotor shaft and the second rotor shaft are both bolts, and a bolt connection of the motor is achieved by a rotational connection of the first rotor shaft and a bolt connection of the second rotor shaft.*

* * * * *